(12) United States Patent
Bunn et al.

(10) Patent No.: US 7,164,666 B2
(45) Date of Patent: Jan. 16, 2007

(54) SYSTEM AND METHOD FOR MULTIPLEXING WIRELESS DEVICES

(75) Inventors: Frank E. Bunn, Toronto (CA); David Hughes, Toronto (CA); Steven Katz, Northridge, CA (US)

(73) Assignee: Northwater Intellectual Property Fund L.P. (Bunn), Toronto (CA)

( * ) Notice: Subject to any disclaimer, the term of this patent is extended or adjusted under 35 U.S.C. 154(b) by 855 days.

(21) Appl. No.: 10/051,746

(22) Filed: Jan. 18, 2002

(65) Prior Publication Data

US 2002/0110098 A1 Aug. 15, 2002

(30) Foreign Application Priority Data

Jan. 18, 2001 (CA) ................................. 2331558

(51) Int. Cl.
*H04Q 7/00* (2006.01)
*H04J 3/16* (2006.01)
(52) U.S. Cl. ..................... 370/329; 370/337; 370/465
(58) Field of Classification Search ................ 370/329, 370/321, 337, 347
See application file for complete search history.

(56) References Cited

U.S. PATENT DOCUMENTS

| 5,765,107 | A |  | 6/1998 | Korowajczuk |
| 5,870,672 | A |  | 2/1999 | Stoddard et al. |
| 5,905,949 | A |  | 5/1999 | Hawkes et al. |
| 6,044,267 | A | * | 3/2000 | Foladare et al. .......... 455/426.1 |
| 6,097,939 | A |  | 8/2000 | Jacobs |
| 6,226,280 | B1 | * | 5/2001 | Roark et al. ................. 370/468 |
| 6,449,483 | B1 | * | 9/2002 | Akhteruzzaman et al. .. 455/445 |
| 6,477,368 | B1 | * | 11/2002 | Korneluk et al. ........... 455/423 |
| 6,563,806 | B1 | * | 5/2003 | Yano et al. .................. 370/330 |
| 6,608,827 | B1 | * | 8/2003 | Austin ......................... 370/465 |
| 6,741,579 | B1 | * | 5/2004 | Choi et al. ................... 370/337 |

* cited by examiner

*Primary Examiner*—Andrew C. Lee
(74) *Attorney, Agent, or Firm*—Kevin Pillay; Gowling Lafleur Henderson LLP

(57) ABSTRACT

A system that multiplexes a plurality of wireless devices with a wireless network, each of the wireless devices sharing a common telephone number. The system assigns a predefined access time for each of said wireless devices. The system also assigns a predefined length of time during which each of said wireless devices will have access to said wireless network. A sequence of accesses to the wireless network can then be initiated in accordance with the predefined access time and the predefined length of time such that a maximum of one of the wireless devices accesses said local network at a time.

1 Claim, 14 Drawing Sheets

SYSTEM AND METHOD FOR MULTIPLEXING WIRELESS DEVICES

The present application claims priority from Canadian Patent Application No. 2,331,558. The present invention relates generally to wireless communication, and specifically to a system and method for multiplexing wireless devices having a single telephone number.

BACKGROUND OF TE INVENTION

Cellular telephony has been designed to permit a wireless device to send date and or voice messages over a wireless communications network providing the device is able to transmit its device identification codes appropriate to the network on which it is attempting to transmit. Wireless communications is a global and rapidly expanding technology. The advent of wireless cellular telephony for digital information applications such as pagers, e-mail and internet, point of sale terminals, and the like, to say nothing of the wireless telephone voice systems applications is compounding this resource depletion problem. Several alternative systems and networks are common, including analogue and digital voice systems, data only systems, cellemerty, short data burst packetizaton, microburst technologies and the like.

Current technology uses identifier codes for each wireless device in the form of an Electronic Serial Number (ESN) and a Mobile Identification Number (MIN) It is standard practice to assign one and only one wireless network system calling number, such as a cellular telephone number (TN), to one and only one mobile device having a unique ESN/MIN combination of identification codes. Several patents, such as U.S. Pat. No. 5,765,107 issued to Korowajesuk, U.S. Pat. No. 5,905,949 issued to Hawkes et al, U.S. Pat. No. 5,870,672 issued to Stoddard et al, and U.S. Pat. No. 6,097,939 issued to Jacobs, have attempted to develop systems to detect the use of more than one mobile device using the same ESN/MIN such that fraudulent use can be traced. This misuse involves having more that one device with the same MIN/ESN pair ID such that the original device assigned the ID gets charged the costs for any use of the network regardless of which actual device uses it. Fraud can be involved if any of the non-original devices are used without authorization by the owner of the original device.

Every time a wireless network communications device is powered, that is the transceiver is powered on, the device transmits its unique code, such as the ESN/MIN pair, to the wireless network communications system with which the device is designed to function. As long as the device is powered the device also send the code at fixed or random, but repeated, intervals to the wireless system with which it is designed to function. Additionally, every time the device attempts to send a message or communication to the network system, the device also transmits its unique ESN and/or MIN codes to Fat system during the initialization of that communication. The system checks the codes to verify that the device is allowed to use the system, and, if verified, allows the device to conduct the communications utilizing the system.

It is the global expansion that is using up the precious resources of radio frequency bandwidth and phone number assignment. However, if multiple devices use the same ESN/MIN pair for the same phone number, it may appear as if someone is attempting to fraudulently utilize the device, Thus there is a need for a system and method that allows multiple devices to share common identifiers without falsely creating a fraud alert.

SUMMARY OF THE INVENTION

In accordance with an aspect of the present invention there is provided a method for multiplexing a plurality of wireless devices with a wireless network, each of the wireless devices sharing a common telephone number. The method assigns a predefined access time for each of said wireless devices. The method also assigns a predefined length of time during which each of said wireless devices will have access to said wireless network. A sequence of accesses to the wireless network can then be initiated in accordance with the predefined access time and the predefined length of time such that a maximum of one of the wireless devices accesses said local network at a time.

BRIEF DESCRIPTION OF THE DRAWINGS

Embodiments of the invention will now be described by way of example only with reference to the following drawing in which.

DETAILED DESCRIPTION OF PREFERRED EMBODIMENTS

Figure 1:
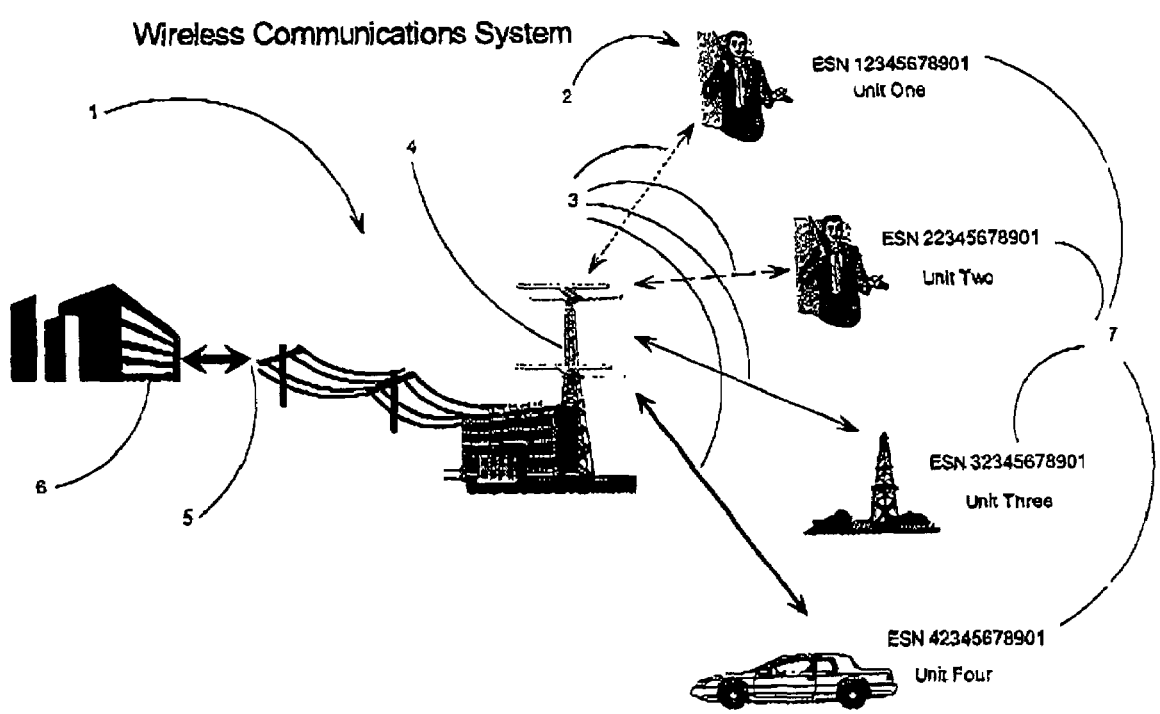
FIG. 1 is a schematic diagram of a wireless communication system (prior art)

For convenience, like numerals in the description refer to like structures in the drawings. Referring to FIG. 1, a schematic view of a cellular network system is illustrated generally by numeral 1 The network system comprises a central controller or computer 6, a plurality of wireless devices 2, a receiving tower 4, standard telephony systems 5, and a controller or computer 6. The network includes one or more central controllers. In the present embodiment, there are four wireless devices, each communicating with the wireless network via radio frequencies 3. The radio frequencies are communicated to the nearby receiving tower 4, which transfers the communications via landlines or other telephony systems 5. The communication can then be transferred to the worldwide telephone system via the central controller or computer 6. Each device 2, is issued a unique Electronic Serial Number (ESN) 7, by the device manufacturer according to prevailing legal requirements.

The central controller or computer 6, serves a specific geographic area. This geographic area may range from a single town to entire countries or continents. The central controllers are connected with each other via a network such as a telephony network or the Internet. The central controllers serving specific geographic areas may be located, for example, at electric meter a reading/billing agencies connected to remote meters (Unit three), vending machine operations headquarters (not shown) or rental vehicle agencies (Unit four), and individual persons (Units one and two). The central controllers may also be accessed by independent distributed terminals linked by suitable communications networks.

Each of the wireless units includes a local controller, circuitry, software, fuzzy logic and hardware capable of permitting the device to function as a wireless communications device. The fuzzy logic hardware and software is further capable of receiving, processing, storing, and controlling the device's power ON and OFF sequencing, accurately keeping time and receiving and updating the programming sequencing and time correction.

Figure 2:
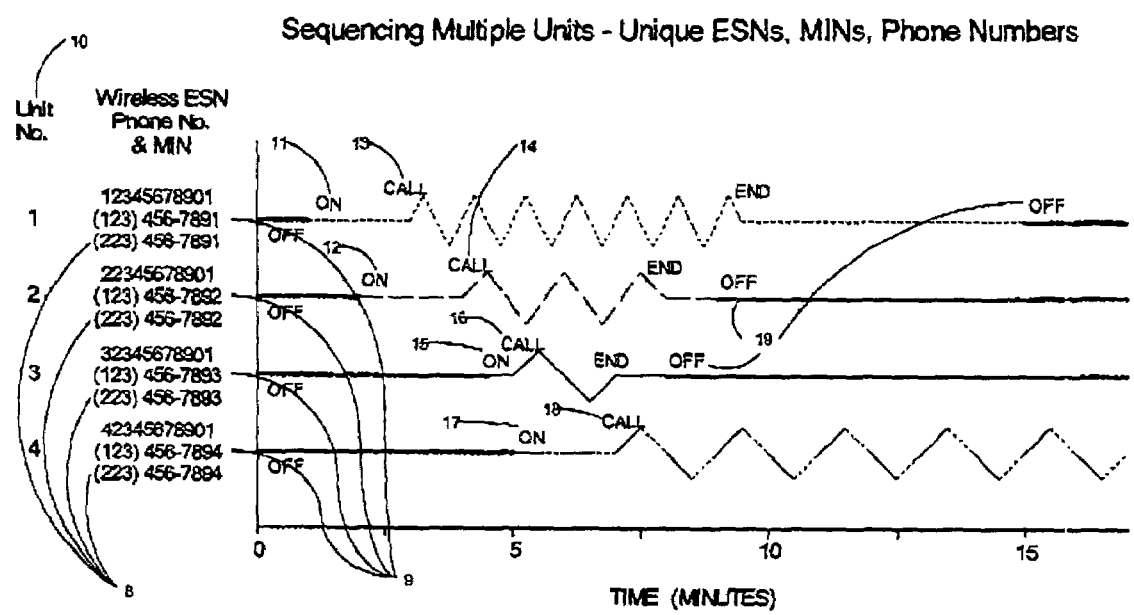
FIG. 2 is a schematic diagram of a sequence of multiple units of wireless communications devices each having unique MIN/ESN and TN (prior art)

Referring to FIG. 2, the standard operation of a mobile device is illustrated. The network assigns two unique numbers to the device. The first number addresses the control channel transceiver and is referred to as the Mobile Identification Number (MIN) 8. The second number addresses the voice channel transceiver the familiar Telephone Number (TN) 9. The MIN and ESN pair forms an identifier (ID) of the device and the TN is simply the telephone number of the device similar to telephone numbers for any telephone system. In the present embodiment, the sequence of multiple units having unique ESNs, MINs, and TNs allow all four devices to be operating at any time. For example, unit one turns on 11 just before unit two runs on 12, and unit one makes a call 13 just before unit two makes a call 14. Shortly thereafter unit three turns on 15 and makes a call 16 just as unit four turns on 17 and makes a call 18. At this point, all four units are on and communicating with the wireless system at the same time. The devices can end their calls and/or turn off independently 19. The wireless system monitors each device separately for time on the system and for subsequent billing as each unit has a unique ID.

If, however, multiple devices have the same MIN, ESN and TN and only one device is powered ON at a time, then the wireless network will have great difficulty recognizing which device is the original. It should be noted that as soon as a typical unit is power ON, the standard cellular unit immediately tries to contact the network to give the network the unit's ID so the network can process any communications for that unit. If, however, two units are ON simultaneously, the network will detect a conflict or communications collision and immediately recognize a potential fraudulent use of the network. This occurs when the second unit tries to access the network while the first unit is communicating with the network, the network knows the MIN/ESN pair ID is already activated and thus the network may assume the second unit is a fraud or clone of the first.

Figure 3:
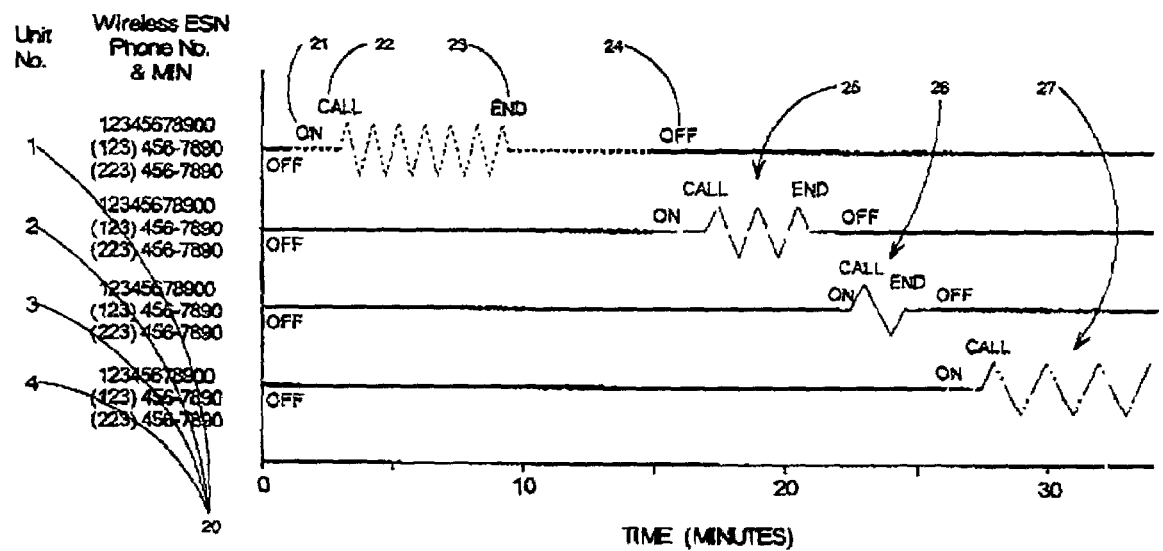
FIG. 3 is a schematic diagram of a sequence of multiple units of wireless communications devices each having the same, shared, MIN/ESN and TN.

Referring to FIG. 3 in accordance with an embodiment of the invention, the timing sequencing for four devices is illustrates. In this case all four devices have the same MIN, ESN, and TN 20. This figure illustrates a method for sequencing the devices such that Unit one tuns power ON 21, makes a call 22 on the network, ends the call 23, and turns power OFF 24 while the other devices are off. Unit two performs a similar sequence 25, followed by Unit three 26, and Unit four 27. Only one unit is powered ON at any point in time.

Figure 4:
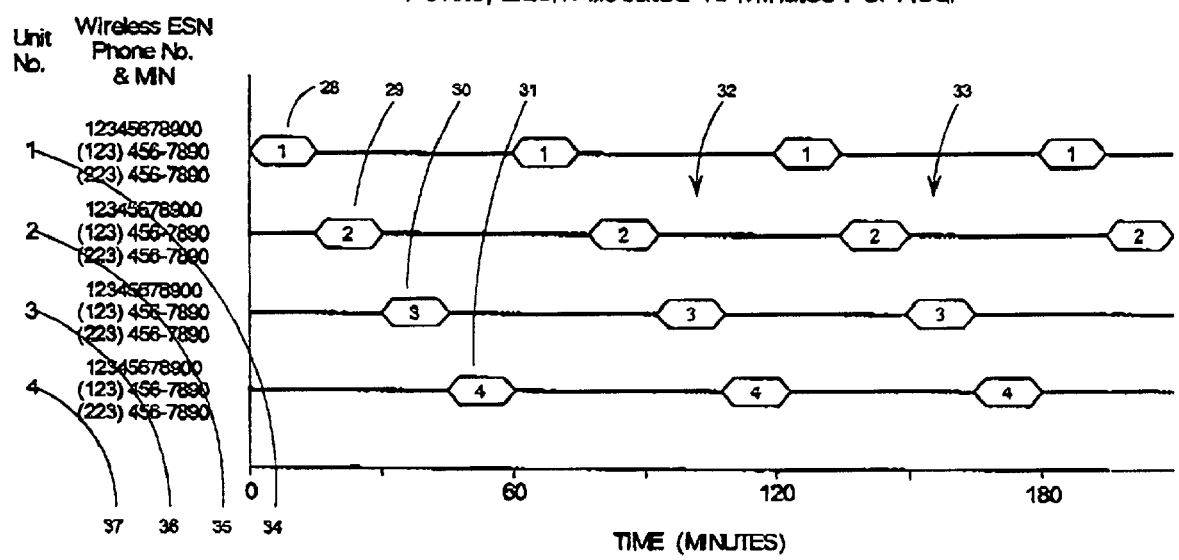
FIG. 4 is a schematic diagram of a sequence of multiple units of wireless devices as illustrated in FIG. 3, each having 15 minutes of access per hour.

Referring to FIG. 4 a sample timing sequence for such a system is illustrated. In the example illustrated in FIG. 4, each of the four units can timeshare their MIN, ESN, and TN by using only an allocated 15 minutes for each per hour of operation. Unit one powers ON and has access to the network for the first fifteen minutes 28, and then powers OFF. Unit two has accessing to the network for the next fifteen minutes 29, followed by Unit three 30, and Unit four 31 all without conflict. The sequence then repeats each hour 32, 33. In the present embodiment, the time of access for each device is programmed and stored in the device. Each of the devices includes a local controller, circuitry, software and hardware capable of receiving and storing the program and measuring time accurately.

Figure 5:
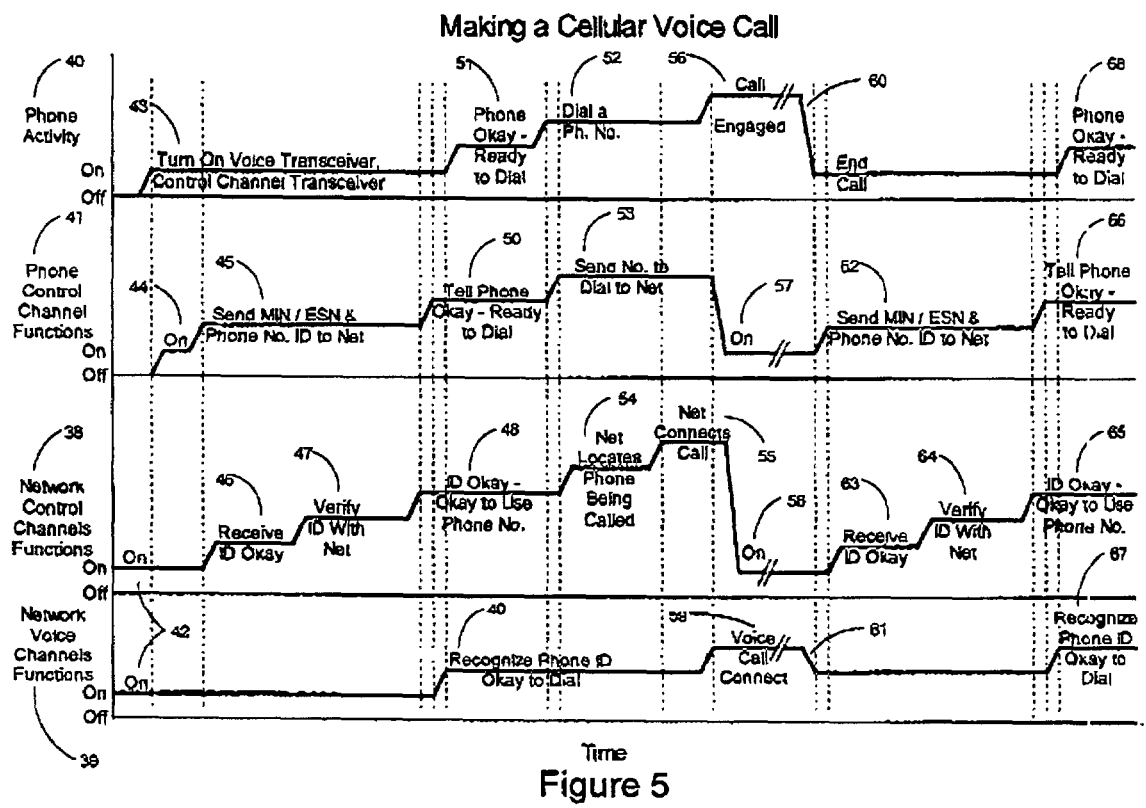
FIG. 5 is a schematic diagram of a sequence of operations of wireless network control channels, voice or data channels, unit control channels, and unit response action when a call is processed (prior art)

In an alternate embodiment, the timing initially stored in the device as described above can be altered, either temporarily or permanently, from a remote location. In order to explain how this can be achieved, the functionality of wireless communication is described. Referring to FIG. 5, the typical functionality of a typical wireless phone cellular devices during power ON and power OFF is illustrated. Wireless communication utilizes cellular network control channels 38, voice channels 39, cellular device activity channels 40, and control channels 41. With respect to any wireless phone, the network control and voice channels are expected to be on and accessible 42 when a phone is turned on 43. At powering ON the transceivers, the phone accesses the wireless network by activating the control channels transceiver 44 to communicate the device's MIN/ESN ID and TN 45 to the network. The network receives the ID 46 and verifies the ID 47 with the networks accounting systems. If the ID is valid, the network accepts the device 48 for use of the network by reading the network for voice channel access and signaling on the control channels 50. The network also instructs the device that it can have access to the voice or data network, that is, it is ready to dial 51.

At some time later, the device can call a telephone number world wide using the standard telephony protocols 52 during which the control channels transceiver passes the device's ID and the dialed telephone number TN to the network 53. The network control channels setup the connection 54 to the called phone and completes the connection 55. The wireless device control channels recognize the connection engaging the call on the voice or data channels 56 and the device control channels revert back to the idle ON condition 57. The network voice channels functionally connect the voice or data call 59 and the network control channels relative to the device also revert to the idle ON condition 58. Upon the phone device ending of the call 60, the network terminates be voice channel connection 61, and the device control channel functions return to the condition of sending the device ID to the network 62. The network control channels receive the ID 63, verity the ID 64 and accept the device as ready to use the network for voice or data communications 65. The device control channels acknowledge ready to dial 66, the network voice channels recognize the device is allowed to dial 67, and the device is actively ready to dial 68. If the device is powered off, the phone activity powers OFF the transceivers, the phone voice and control channels deactivate, and the network control and voice channels cease to acknowledge the presence of the device until its activity is powered ON and the process begins again.

In the present embodiment, necessary circuitry and subsystems are included in the local controller to receive a sequencing program and/or accurate time update corrections. These adjustments can be made through a wireless network communication, a hardwired link, or a radio transmission during any sequence wherein the device is turned ON. Furthermore, the central controller includes the necessary software, hardware, and fuzzy logic to download the program and time updates. For the cellular network system described above, these communications are done using the voice or data channels of the device and most often would transmit the communication using the voice transceiver. This communication follows the typical process described with reference to FIG. 5.

Figure 6:
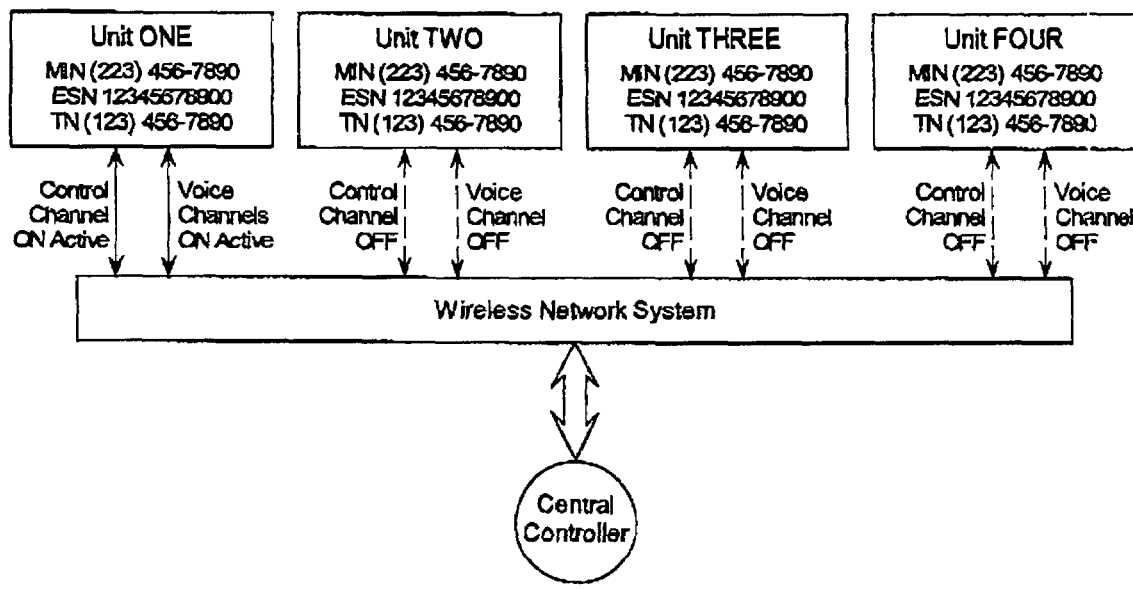
FIG. 6(a) is a schematic diagram of a system of four units, each having shared MIN/ESN and TN and bi-directional linking capabilities with the central controller.
FIG. 6(b) is a schematic diagram of a sequence of four units, each having shared MIN/ESN and TN illustrating re-programmable timing.
Figure 6:
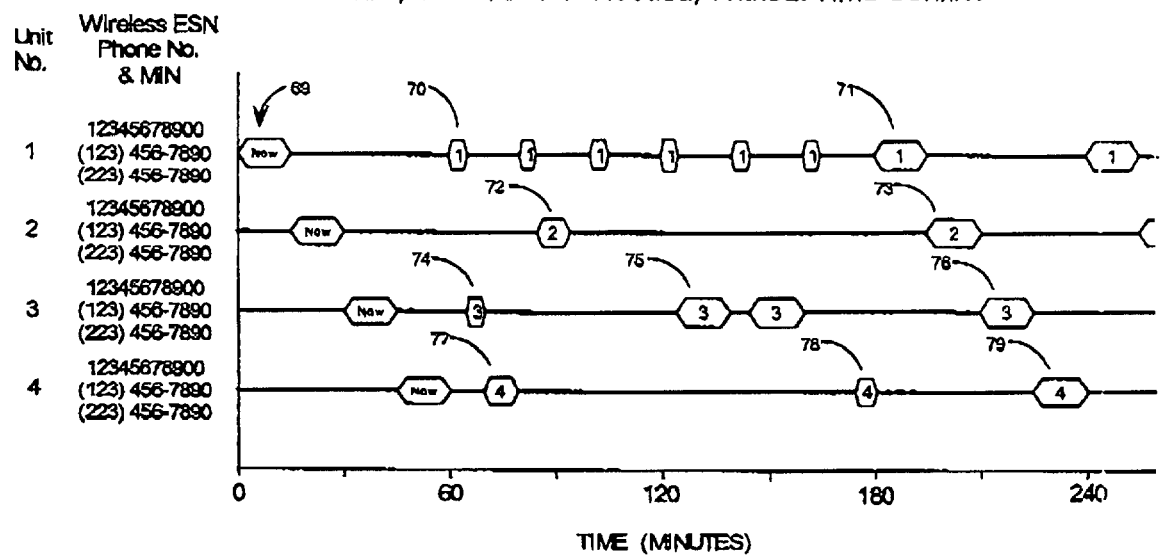

FIG. 6(*a*) is a schematic diagram of the overall operation of a system of four units all having the same ID and TN but only one unit being turn ON active. FIG. 6(*b*) illustrates the method to assure no conflict with other units have the same ID and TN during the reprogrammed operation of the units. Give the four units of our example have been programmed by hardwired connection to the unit, i.e. not using the wireless network, so each unit accesses the network for fifteen minutes out of every hour, the central controller including necessary fuzzy logic, software and hardware can pot a user to implement a New 69, programming change to each unit, utilizing communications to that unit during one or more of its active network access time periods. If multiple time periods are required to complete communication of the reprogramming for each unit, then during the last period used for reprogramming each unit, the unit could be told to use the new programming but only after an assigned waiting period additionally included in the reprogramming instructions to the local controller of the device unit being programmed; that is, that it is to remain powered off for the assignable period of time sufficient following its programming for the central controller to reprogram all the units having the same ID and TN. The local controller will include the circuitry, memory, software and hardware capability to maintain the program in memory storage and the clock function facilities during power OFF of the device transceivers or the unit itself. Returning to FIG. 6, each unit is reprogrammed during one fifteen minute active sequence such that unit 1 is to turn on for five minutes every twenty minute starting on the next hour for a duration of two hours 70, and then revert to the old sequence of on for fifteen minutes on the hour 71. Unit two is reprogrammed to turn on for 10 minutes from twenty five to thirty five minutes after the hour during the next hour 72, and then revert back to the old sequence of on for fifteen minutes every hour starting in the next following hour 73. Unit three is reprogrammed to turn on once for five minutes at five minutes after the next hour 74, and then turn on twice for fifteen minutes at five minutes and at twenty five minutes after the next following hour 75, and then revert back to the old sequence of on for fifteen minutes every hour starting in the next following hour 76. Unit four is reprogrammed to turn on for ten minutes at ten minutes after the next hour 77, and then to turn on for five minutes at fifty five minutes after the next hour 78, and then revert back to the old sequence of on for fifteen minutes every hour starting in the next following hour 79.

Figure 7:
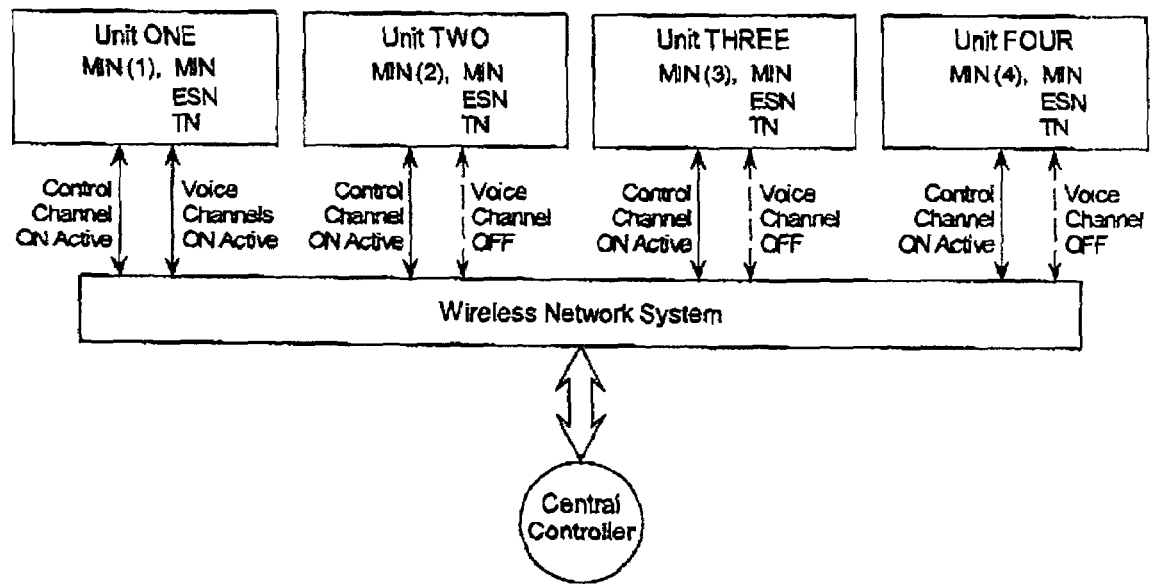
FIG. 7(a) is a schematic diagram of a system of four units, each having shared MIN/ESN and TN plus each having one unique MIN (#) illustrating bi-directional linkage to the wireless network and thus bi-directional linkage to the central controller.
FIG. 7(b) is a schematic diagram of a sequence of operations for a wireless network, the units control channels transceiver and the units voice or data channels transceiver activity and response action controlled by the units control channel transceiver for switching from unique MIN (#) and shared ESN operation to shared MIN/ESN and TN operation.
Figure 7:
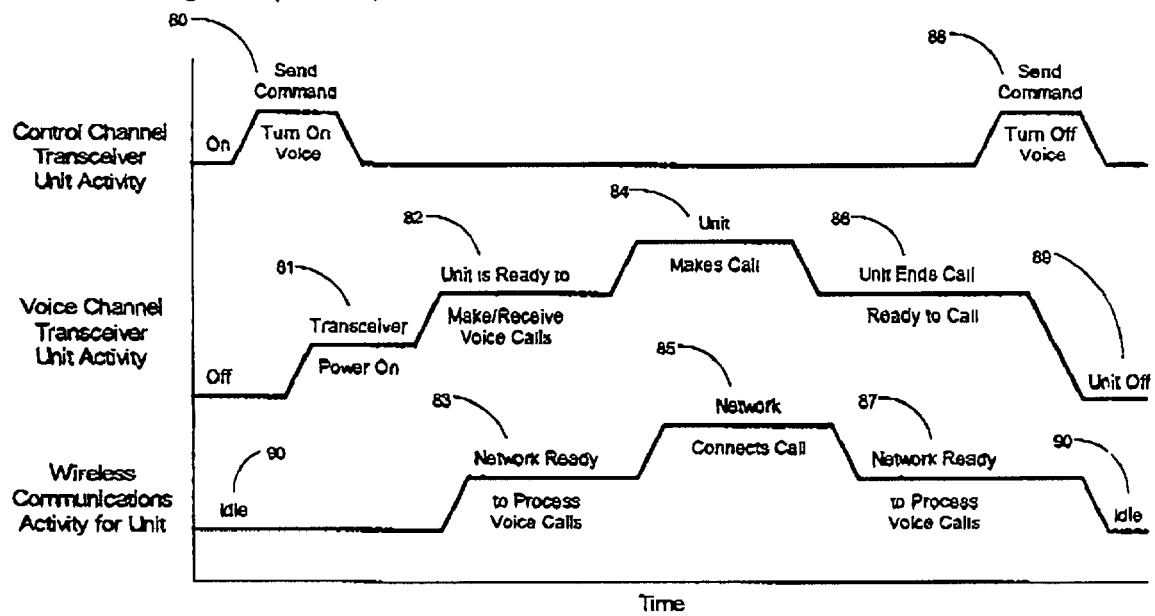

FIG. 7(*a*) is a schematic diagram of the overall operation of a system of four units all having stored an unique MIN (#) and also having stored the same general MIN/ESN ID and TN. Recall that the wireless network first contacts a device by calling its control channels transceiver utilizing the MIN/ESN ID assigned to that unit. The central controller including the necessary fuzzy logic, software, hardware and interface electronics can connect to the device directly without utilizing the wireless network control channels, so as each unit can be loaded with a unique MIN and also load the general MIN/ESN ID and Telephone Number TN that all units share. The wireless network will thus be able to communicate over the control channels with each unit independently or all simultaneously using each units unique MIN (#) and the general ESN as the ID and the network will also be able to communicate over the voice or data channels with the specific unit which has been commanded by the central controller to switch to voice or data operation using the general MIN/ESN and TN.

Referring to FIG. 7(*a*), the second embodiment is for the central controller including the software, fuzzy logic, circuitry and hardware to access control channels of the wireless network system to be use to communicate a command to a specific device to power ON in the condition of using the general MIN/ESN and TN shared by all units but only turned on for this specific unit and later to power OFF. This embodiment in our four device example utilizes the condition in which each unit has stored in its memory, a unique MIN (#) assigned to its control channels transceiver in addition to the same MIN/ESN and telephone number TN that each of the units have stored in memory. All four units are considered to have their control channel transceivers powered ON utilizing the units unique MIN and the general ESN as its ID and voice or data transceiver powered off so thusly all units are continuously acknowledged and verified by the network control channel communications as active on the system.

In FIG. 7(*b*) the central controller has selected unit one with unique MIN (223) 4567891 and general ESN 12345678900 as its ID and to be commanded via communication on the units control channels 80, to power on this unit's voice or data transceiver and switching operation of the unit 81, to that using the same MIN (223) 4567890 ESN 12345678900 ID and (123) 456-7890 TN and the voice channels transceiver activates and the unit is ready to make a voice call 82, and the network is ready to process calls 83. The unit can then make or receive a call 84, the network connects the call 85, until the unit ends the cal and is ready to make or receive a call 86, at which time the network returns its status to ready to process calls 87. When the central controller wishes to command the unit to turn off the voice transceiver 88, this message must be sent via a voice call and the unit responses to this command and powers the voice transceiver to powered OFF 89 and reverts the unit to operation on the control channels using the unique MIN (#) and shared ESN ID, and the network returns its status to the idle condition acknowledging of the unit as still active on the system 90.

Figure 8:
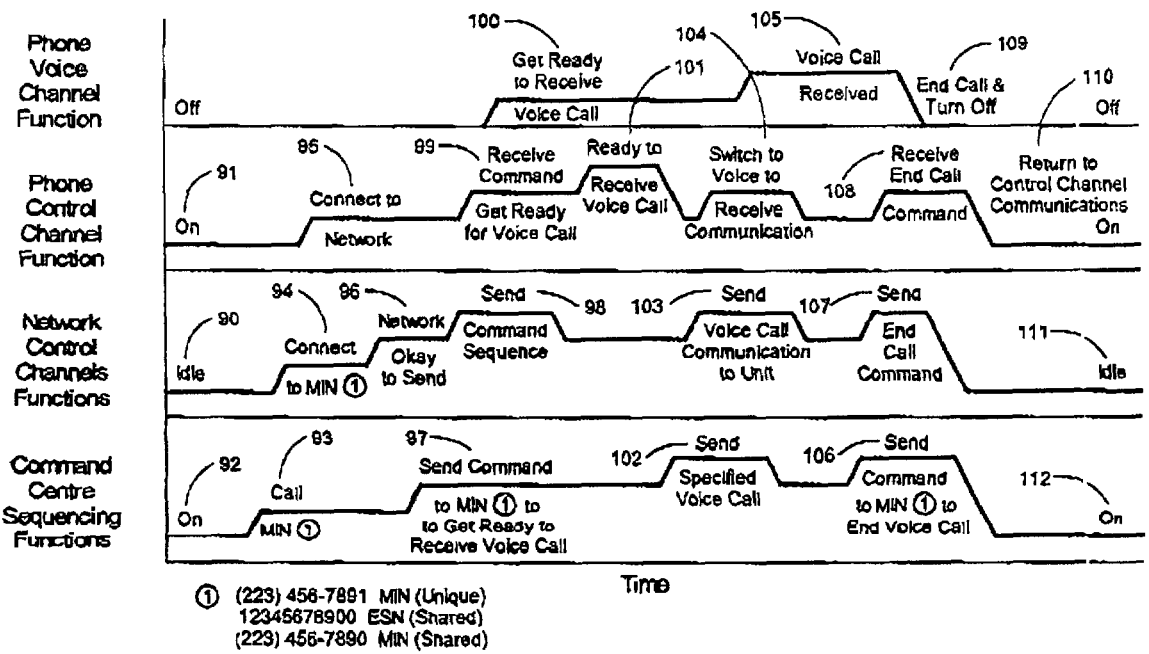
FIG. 8 is a schematic diagram of the sequencing of operation of the wireless network control channels, the units control channels and the units voice or data channels function and response action controlled by the central controller controlling the units unique MIN (#) to receive a voice call.

Referring to FIG. 8 the central controller can utilize the capability to access any of the units independently as illustrated in FIG. 7(*a*), where each unit has a unique MIN (#) and therefore unique ID but all units have the same Telephone Number, TN, to which the costs of utilizing the wireless network can be legitimately billed and as all units are past of the central controller system, these billings will be non-fraudulent and legal. The cellular device units include the fuzzy logic, electronic circuitry, memory, software, hardware to be able to connect to the wireless network, to be able to await a command to get ready to receive or make a voice or data call, receive or make the call, end the call and receive the command to return to the idle but control channels ON condition. This is illustrated in FIG. 8 where all units are considered to have their control channels transceiver powered ON and thus all are continuously acknowledged and verified by the network control channels communications as active on the system 91. The network control channels are also considered to be ON and active 90, and the central controller systems are also ON and active 92. The central controller can decide to call 93, a unit, say unit one of our four unit example, by sending a command to the wireless network control channels 94, to connect to the unit with unique ID using unique MIN (1) (223) 456-7891 and shared ESN 12345678900 of unit one which the network does using the control channels. The unit one connects 95, to the network and the network acknowledges 96, to which the central controller can then send a command sequence 97, to the network to tell unit one to get ready to receive a voice or data call and the network communicates this command sequence 98, to unit one and unit one receives the command sequence 99, and powers ON the voice or data transceiver and switches 100, the unit to be operating using the shared MIN/ESN and TN making the unit ready to receive a voice or data call and the network can acknowledge 101, the unit. Now the central controller can either send a voice or data call to unit one or the unit itself can make or receive a voice call. The central controller also can now send a command sequence over the voice channels instructing the unit to make a specified voice or data call such as calling into the central controller to report any information, sensor data, environmental parameters or what ever the local controller associated with unit one has to report. Clearly the central controller includes the software, fuzzy logic and data base systems needed to keep track of which units are operating on unique MN (#) and make sure only one unit of the sharing group on units is commanded to operate using the shared MIN/ESN ID and TN thereby avoiding communications collisions discussed earlier.

In FIG. 8 the central controller is shown sending a specific voice call such as downloading of data, parameters, software, voice scripts or any such information to unit one by sending the call 102, to the network to which the network using the control channels sends 103, commands to unit one tells unit one a voice call is coming and unit one's control channels receive the notice of a coming voice call and commands 104, unit one to receive a voice call and as unit one has switched to the voice communications operation using the shared MIN/ESN ID and TN it receives the call 105. Later, the central controller terminates the call by sending the call end message 106, to the network which sends a call end command 107, to unit one via the control channels to which the unit control channels receive the end command 108, and terminate the call. In the FIG. 8 illustration it is shown that the message being sent from the central controller is to terminate the call and subsequently revert back to using the unique MIN (1) and shared ESN and TN and turn off the voice transceiver 109. The unit one reverts to the idle condition of the control channels ON and active 110 as are the network 111, and the central controller 112.

Figure 9:
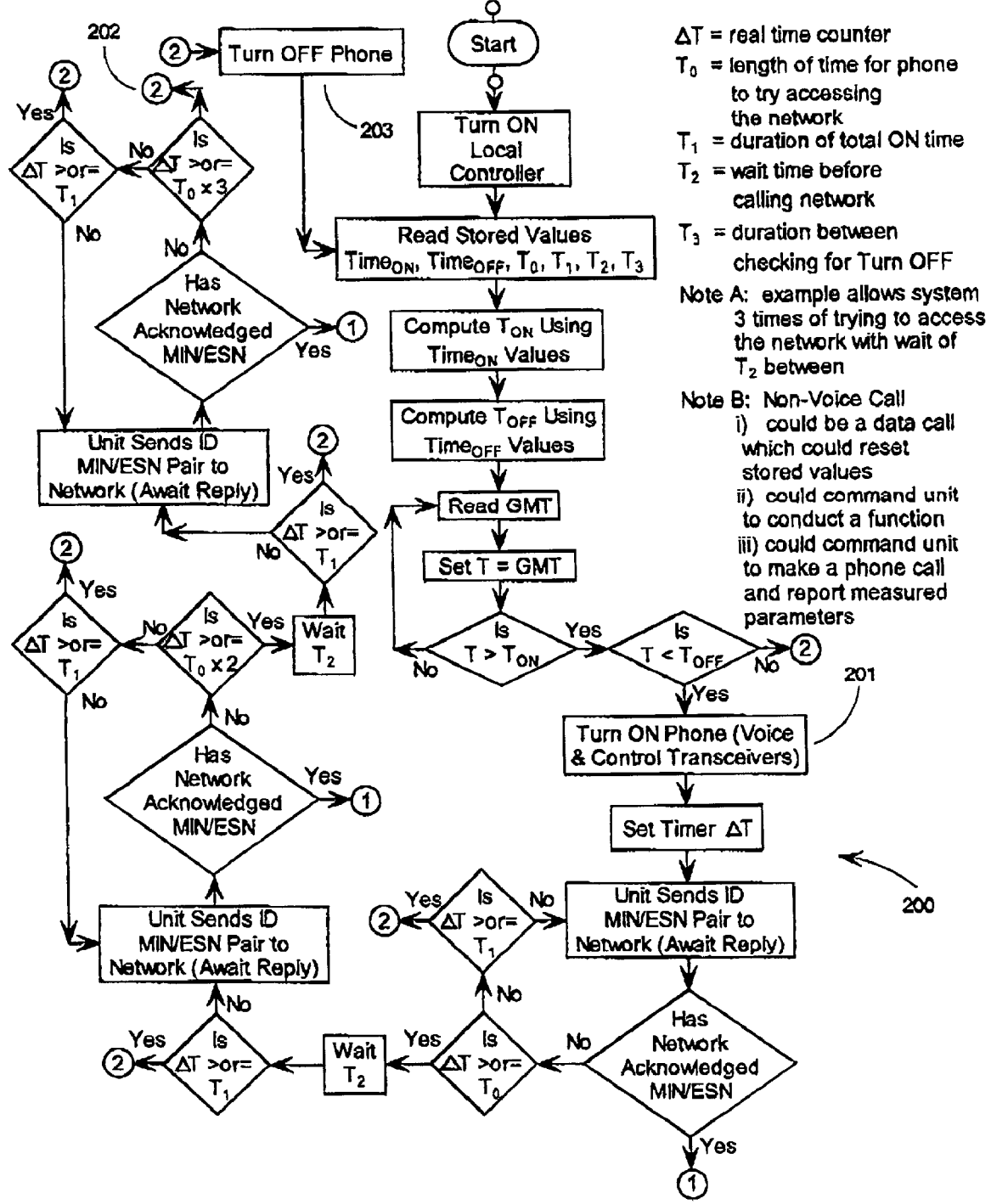
FIGS. 9(a) and (b) are schematic diagrams of a process flow for the remote unit controlling access to the wireless network.
FIG. 9(c) is a schematic diagram of a fuzzy logic selection algorithm as implemented in FIGS. 9(a) and (b)
Figure 9:
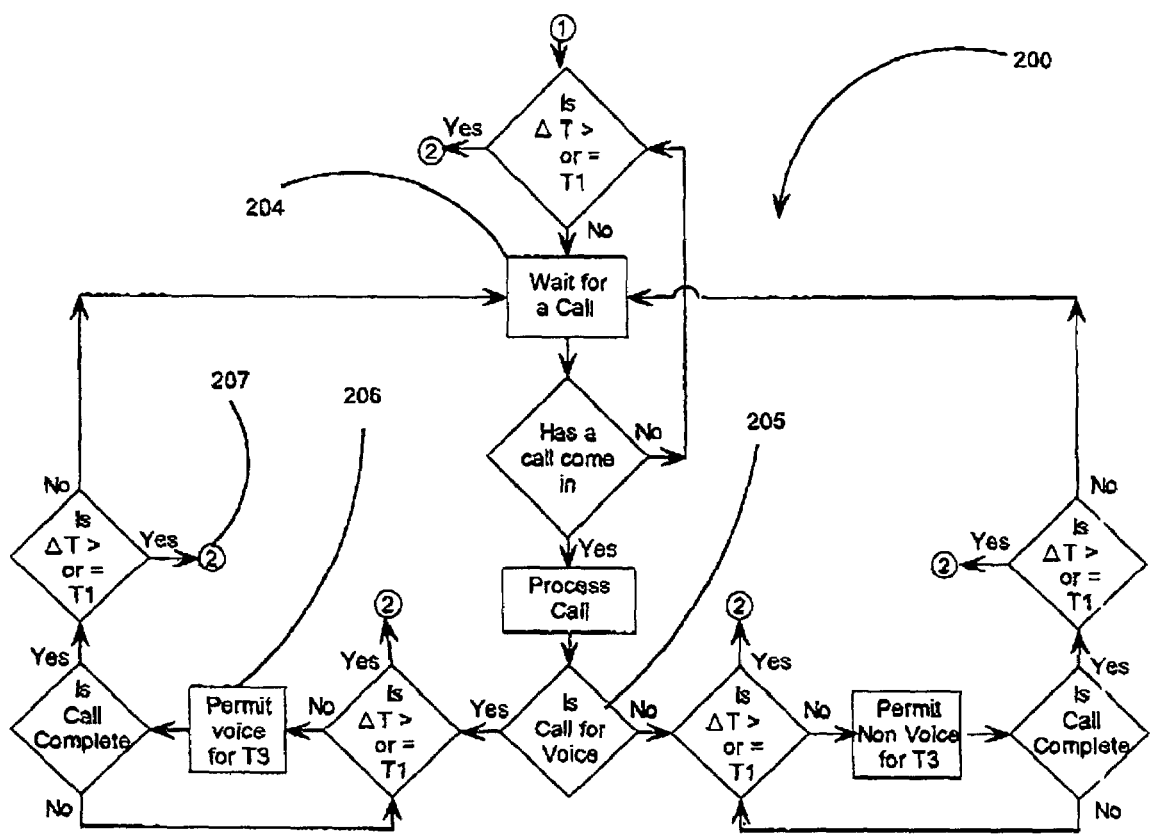
Figure 9:
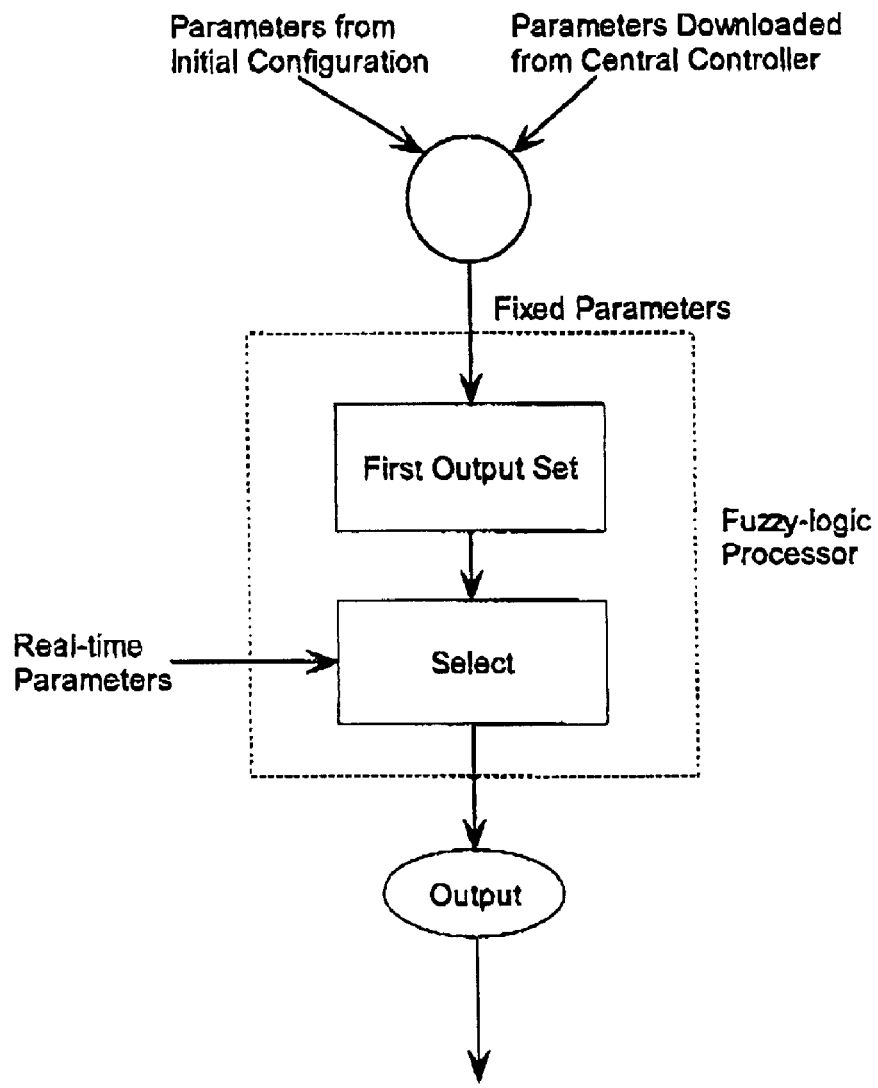

Referring to FIGS. 9(*a*) and 9(*b*), a schematic diagram of the overall fuzzy logic for operation of a unit comprising a local controller associated with a wireless device using shared MIN/ESN ID and TN working in the condition where the device's local controllers have been loaded with specific parameters allowing them to control their access to the wireless network without causing communications collisions due more than one unit with the same MIN/ESN ID being powered ON and thus accessing the system at the same time is shown generally by numeral 200. FIG. 9(*c*) is a schematic diagram showing the fuzz logic selection algorithm. Turning power ON the local controller associated with the wireless device, the local controller is initialized according to the specific timing sequence parameters stored in its non-volatile memory and using fuzzy logic the unit waits until its computed tie to activate 201 for a period of time T1. Thus activated; the local controller tries to contact the wireless system for a period of time T0 and if unsuccessful, it waits for a time T2 before repeating the contacting process and this process can be repeated as many times a the logic its which here 202, is shown as three times after which the local controller powers OFF the wireless device and resets to wait until the next system computed time to activate the system again 201.

When the local controller and the wireless device successfully access the wireless network, the local controller activates the wireless device to be ready to receive a voice or data phone call 204, and unit waits for a call. If a call does not come during the computed duration time T1 of access to the wireless network, then the local controller again 203, powers OFF the wireless device until the next system computed time to activate the system at 201. If a call comes during the active access to the wireless network, the system using fuzzy logic decides 205, if the call is a voice call and processes the call while checking 206, every T3 time duration, to detect if the network access time period has elapsed. If the call is ended and the network access time has not elapsed the fuzzy logic returns to waiting for a call 204, but if the time has elapsed 207, the local controller powers OFF the wireless device and resets to wait until the next system computed time to activate the system again 201.

Figure 10:
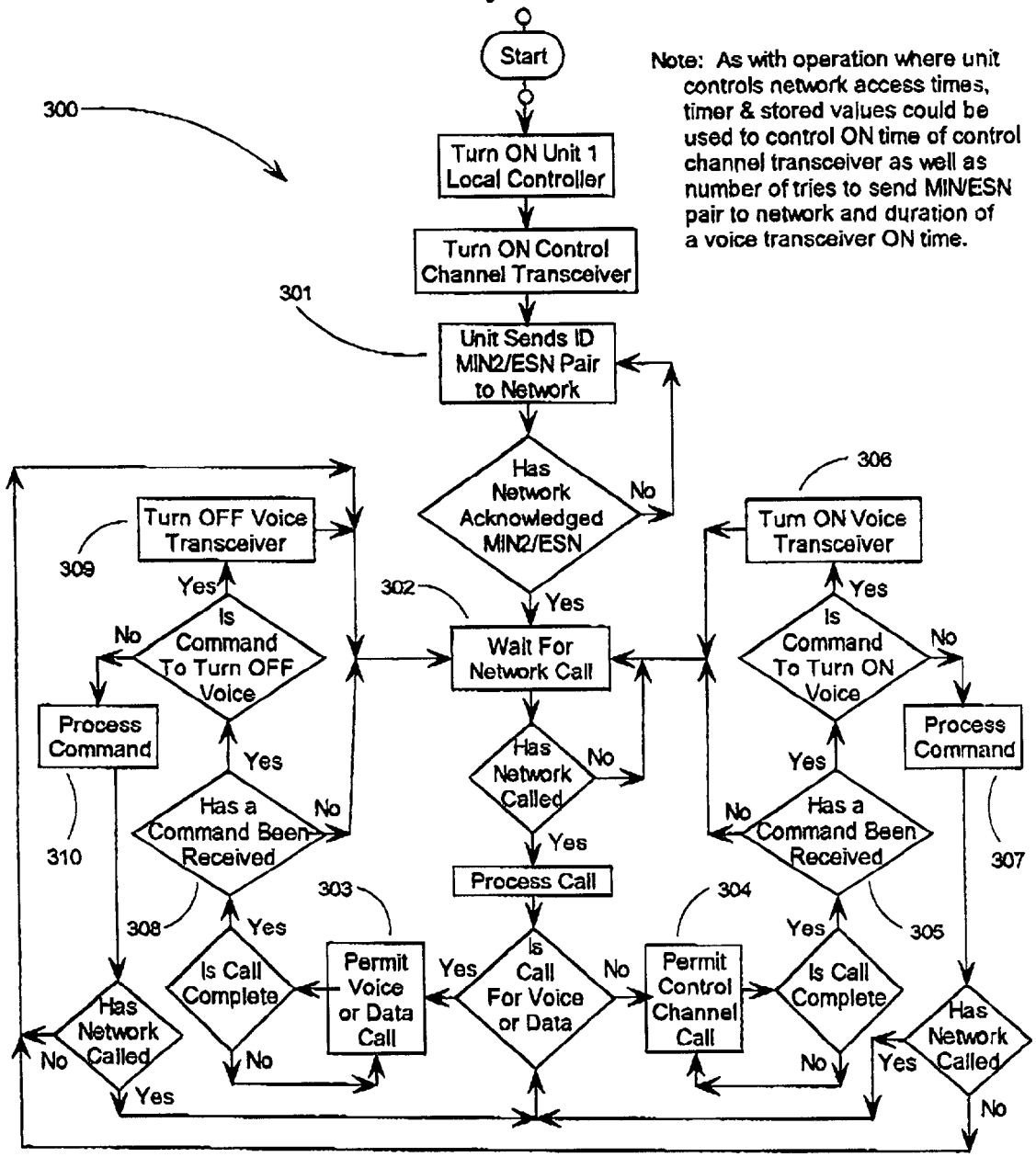
FIG. 10 is a schematic diagram of a process flow for the remote unit controlling incorporating fuzzy logic of FIG. 9(c) to process the central controller commands to switch to and from voice or control channels calls.

Referring to FIG. 10, a schematic diagram of the overall fuzzy logic for operation of a multiple of units comprising a local controller associated with a wireless devices using shared MIN/ESN ID and TN as well as an additional unique MIN is shown generally by numeral 300. Upon power ON of the local controller, for say unit one, the controller initializes the unit with the parameters that have been stored in the local controller's non-volatile memory activating the wireless device using 301, the unique MIN (1), and the shared ESN as the ID for communications on the wireless control channels. In our example of four such units, each would be activated and acknowledged by the wireless network and awaiting calls 302, only on the control channels. When the call arrives the local controller fiery logic only recognized the call if it is a control channels only call, and processes 304, the call, and assesses if the call has a command action 305, needing response. If no command is received the local controller returns the system 302, to waiting for a call but if the call has a command and tat command is to turn ON the voice channels, the local controller powers ON the voice transceiver and activates the operation using the shared MIN/ESN ID and TN and returns the system 302 to waiting for a call but this time the call can be a voice or data call. If the command is of another type, the local controller processes 307, the command with appropriate action, checks for other control channel calls and returns the system 302, to waiting for a call.

When then next call arrives the fuzzy logic decides if it is a control channels call and it processes the call by 304, as above but if it decides the call is a voice or data call it processes 303, the call as a voice or data call and assesses 308, if the call has a command action needing response. If no command is received after processing the voice or data call, the local controller returns the system 302, to waiting for a call but if the call has a command and that command is to turn OFF the voice channels, the local controller powers OFF 309, the voice transceiver and activates the operation using the unique MIN (1) and the shared ESN as ID for communications on the wireless control channels and returns the system 302 to waiting for a call but this time the call can only be a control channel call. If the command is of another type, the local controller processes 310, the command with appropriate action, checks for other voice or data calls and returns the system 302, to waiting for a call.

The system and method described above enables multiplexing the use of a given pair of identifying codes in order to conserve wireless communications resources. The current practice of assigning one phone number to each new device identification code accessing the network imposes significant costs onto the communications network provider. These costs include establishing new phone numbers, expanding the network data base system for each new number, expanding he telephony switching systems to handle the new numbers, expanding the automated billing systems to handle the new numbers, maintaining ever larger network systems to support more numbers. These costs to the network providers could be slashed by orders of magnitude through the application of the methods described herein. For example, assigning one phone number to 10 devices each with identical identification codes approved for accessing the network could reduce these costs by a factor of 10 to 1. Furthermore, the network system providers could gain a 10 to 1 increased income from more use of the network. All this improvement in efficient use of the network at reduced cost and increased income is in addition to gains from conserving the frequency bandwidth and device's calling phone number resources.

Even more significant gains could come from opening up new markets for the network providers implementing these methods and apparatus. There are numerous low volume data reporting applications such as remote metering devices, for example, which need to report small quantities of data on a regular, but infrequent basis. Wireless data fission is an ideal solution but the fixed costs to network providers, and indirectly to end users, of maintaining a unique MIN/ESN pair for each device make use of existing wireless networks too expensive to be commercially viable. Multiplexing of wireless devices could reduce costs substantially with the result that such applications using "limited time" access to the network could bring new revenue streams to the network providers without using up precious phone number and bandwidth resources.

Additionally, gains could be realized as the invention can be applied across multiple platforms, including but not limited to, analogue and digital cellular phones, one-way pagers and two-way pagers.

Further, a significant saving is the cost saving in fees to access the system. The way most existing network systems operate is to charge an access fee, often fixed monthly, annually, or such like, for each device, with its unique identification codes such as MIN/ESN, approved to access the network. The methods described herein allow as many devices Fat have been established with the same codes to access the network for one fee. For methods where user share the same ESN and TN, but have a unique MIN, the extra cost is in the order of cents, and is thus usually insignificant. Additionally, network providers offer blocks of network access time packaged into the fixed fee-period. Applications that require small amounts of access time per month are wasting access that is already paid for. The methods described above can multiplex these applications so that the packaged access time could be utilized fully in each fee-period making up to 100% efficient use of the service paid for by the user and provided by the network.

The number of devices that could be multiplexed is nearly limitless, and depends mainly upon the length of powerstime and the scheduling of the power-on-time. As another example, if 1,440 devices are utilized and all given one minute of access, then in one day (1440 minutes) they all could access, or be accessed by, the network system. An application example of this use could be the automatic reporting of electricity meter readings, where metering facilities at the electricity user's location could be appropriately equipped and programmed to call in to a billing office once per month to report the current electricity usage from the metering facility.

The main restriction is that it is preferable that no two wireless devices be powered on at the same time. This limit is a result of the fact that wireless communications network providers route messages to a specific identification set of codes such as a MIN/ESN combination. As a result, the network providers would be unable to route messages appropriately if two or more devices with the same MI/ESNN combination were to access the network simultaneously. This restriction is not a limitation of the method disclosed.

The length of time any one device is powered on need not be a function of any other device's on-time. The scheduling must be coordinated for all devices having the same codes, and this facility is preferably built into the devices themselves. The scheduling can be set or reset remotely via the communications network or a central calling facility sending the scheduling to the device configured to receive and store the schedule. The scheduling also could be loaded and stored into the device by physically connecting it to a scheduling system or the device could have the scheduling stored permanently in the device. In the event of a power failure to the device, when power is restored the device is configured so that the transmitter component remains off. The power turns on when the device checks the scheduling or power on cycling sequence stored in the device's non-volatile memory to doe when that device is scheduled to apply power to its transceiver.

Whether the wireless device initiates the call to the communications network or a host central system calls the device, the function and the scheduling requirement are the same. In the case where the wireless device is placing a call to the communications network, the device has the facility to maintain accurate time and have calling scheduling stored within the device. In the case where the centralized facility calls the device, the scheduling could be maintained in the central facility and the wireless device need only store the time of day and duration of power-on time. In both cases, the device is envisioned to facilitate wireless updating of the time of day, the power-on duration and time of power-on.

In the case where the device automatically calls to a centralized facility to automatically report, the device is configured to have stored in its memory the scheduling of what information is to be reported, as well as the cycling sequence of current time of day, power on duration, and the time of power on for the device's transceiver. In the case where a person is using the device to initiate a voice or data call, the device still retains the cycling sequence of current time of day, power on duration, and the tune of power on for the device's transceiver. The device can be configured to display to the user, current time and/or time remaining until the next transceiver power-on cycle and duration sequence for that device.

The applications for this multiplexing of devices is very broad and not limited to the geographic location of the device, nor the wireless communications system receiving facility, location nor the wireless communications system itself. The applications include regular voice communications and data communications, and are not limited to the type of networks or the protocols on which they operate. These protocols include analogue AMPS, digital CDMA, GSM, TDMA, CDPD. Further, the application is not limited by the devices themselves, including cellular phones, pagers, personal assistants, or their operating systems.

The 10 device example could represent ten cellular telephones used by ten people of a group, and each phone is programmed to access the network only at preset times. The phone could be programmed such that it alerts the user when its network system access time is active. In this example, each of the users in the group could make a voice call limited in time to once per hour and limited in duration to 6 minutes.

The 1440 device example could represent 1440 electric meters which initiate the call, rapidly report data to a central facility, and terminate the call within one minute, and all 1440 within one day. If meter readings are only needed once per month, and if the calls are each one minute or less, then for a 30 day month 31,320 devices could report meter readings.

In an application where the device is located in a mobile unit, say a vehicle, and if the location of the vehicle is important, the device could contain the apparatus and facility to access the global positioning system of satellites (GPS). In this case, the accurate updating of time and date as well as position could be acquired from the GPS communications. The device could then also report the GPS information as well as the information for which the device was designed and implemented. Another example where the device could automatically update its stored time of day is where the device is configured to connect with a source of time calibrations such as the standard broadcast time signals from WWV, in the U.S.A., or CHU, in Canada and the like.

In any of these applications, the limited duration of a call by any one device, and hence the limit of information communicated during a call, could be augmented by the device having the facility to segment the information to be transmitted. The device could begin transmitting information and as the transmission progressed, the device could recognize that the call termination time limit was near. The device so could close the current information transmission and terminate the call within the time limit, such that the device could continue the transmission in the next allowed transmitter power-on cycle, continuing from the point at which it left off in the previous call. This way, there is virtually no limit on the amount of information transmitted from any given device. The facility being called would need to have the appropriate facility to receive segmented information and be able to reassemble these segments for a complete message. Error correction methods familiar to the technology could be incorporated in both the devices and the central facility to assure any messages or segments received or interrupted could be retransmitted so that messages could be successfully assembled.

The terms and expressions which have been employed in this specification are used as terms of description and not of limitations, there is no intention in the use of such terms and expressions to exclude any equivalence of the features shown and described or portions thereof. While the invention has been described in connection with the specific embodiments thereof, and in a specific use, various modifications will be apparent to those skilled in tile art, without departing from the spirit of the invention as set forth in the claims appended hereto.

The embodiments of the invention in which an exclusive property or privilege is claimed are defined as follows:

1. A method for multiplexing a plurality of wireless devices with a wireless network, each of said wireless devices sharing a common telephone number, said method comprising the steps of:
   (a) assigning a predefined access time for each of said wireless devices;
   (b) assigning a predefined length of time during which each of said wireless devices will have access to said wireless network;
   (c) initiating a sequence of accesses to said wireless network in accordance with said predefined access time and said predefined length of time such that a maximum of one of said wireless devices accesses said wireless network at a time.

* * * * *